United States Patent
Vassura et al.

(10) Patent No.: US 8,662,399 B2
(45) Date of Patent: Mar. 4, 2014

(54) RECHARGE CRADLE FOR A CODED INFORMATION READER AND READING SYSTEM COMPRISING IT

(75) Inventors: Stefano Vassura, Rastignano (IT); Manlio Galanti, San Giovanni in Persiceto (IT); Marco Landolfi, Bologna (IT)

(73) Assignee: Datalogic Scanning Group S.R.L., Lippo di Calderara di Reno (BO) (IT)

( * ) Notice: Subject to any disclaimer, the term of this patent is extended or adjusted under 35 U.S.C. 154(b) by 85 days.

(21) Appl. No.: 12/993,169

(22) PCT Filed: May 28, 2008

(86) PCT No.: PCT/IT2008/000353
§ 371 (c)(1),
(2), (4) Date: Nov. 17, 2010

(87) PCT Pub. No.: WO2009/144751
PCT Pub. Date: Dec. 3, 2009

(65) Prior Publication Data
US 2011/0073658 A1 Mar. 31, 2011

(51) Int. Cl.
*G06K 7/10* (2006.01)

(52) U.S. Cl.
USPC .................. 235/472.01; 235/462.45; 235/375

(58) Field of Classification Search
USPC .................... 235/472.01, 462.45, 375, 486
See application file for complete search history.

(56) References Cited

U.S. PATENT DOCUMENTS

| | | | |
|---|---|---|---|
| 3,842,281 A | 10/1974 | Goodrich | |
| 5,155,346 A * | 10/1992 | Doing et al. | 235/462.45 |
| 5,661,292 A | 8/1997 | Knowles et al. | |
| 5,796,091 A | 8/1998 | Schmidt et al. | |
| 5,949,052 A | 9/1999 | Longacre, Jr. et al. | |
| 6,123,263 A | 9/2000 | Feng | |
| 6,184,534 B1 | 2/2001 | Stephany et al. | |
| 6,216,951 B1 | 4/2001 | Swift et al. | |
| 6,394,355 B1 | 5/2002 | Schlieffers et al. | |
| 6,832,729 B1 | 12/2004 | Perry et al. | |
| 6,860,427 B1 | 3/2005 | Schmidt et al. | |
| 7,040,540 B2 | 5/2006 | Knowles et al. | |
| 7,048,188 B2 | 5/2006 | Kumagai et al. | |

(Continued)

FOREIGN PATENT DOCUMENTS

WO WO2007076932 A2 7/2007
WO WO2009144750 A1 12/2009

OTHER PUBLICATIONS

International Preliminary Report on Patentability Dated Nov. 30, 2010 from corresponding International Application No. PCT/IT2008/000353.

(Continued)

*Primary Examiner* — Edwyn Labaze
(74) *Attorney, Agent, or Firm* — Duane Morris LLP

(57) ABSTRACT

A cradle for a hand held, battery-powered coded information reader comprises a base part and a reader support part which can be oriented with respect to the base part in at least two positions, the cradle including a power supply input and a power supply/recharge electrical interface for coupling with an electrical interface of the reader when supported in the cradle. The power supply input and the electrical interface of the cradle are housed in the support part. The cradle permits recharging irrespectively of the reader orientation.

21 Claims, 5 Drawing Sheets

(56) References Cited

U.S. PATENT DOCUMENTS

| | | | |
|---|---|---|---|
| 7,051,940 B2 | 5/2006 | Tamburrini et al. | |
| 7,102,328 B2 * | 9/2006 | Long et al. | 320/115 |
| 7,222,794 B2 | 5/2007 | Kumagai et al. | |
| 8,186,592 B2 * | 5/2012 | Fletcher | 235/454 |
| 2003/0098350 A1 | 5/2003 | Liou et al. | |
| 2004/0206822 A1 | 10/2004 | Crandall | |
| 2011/0069877 A1 | 3/2011 | Vincenzi | |

OTHER PUBLICATIONS

International Search Report Dated Feb. 4, 2009 from corresponding International Application No. PCT/IT2008/000353.
Notice of Copending Application.
International Search Report Dated Feb. 3, 2009 from corresponding International Application No. PCT/IT2008/000352.

* cited by examiner

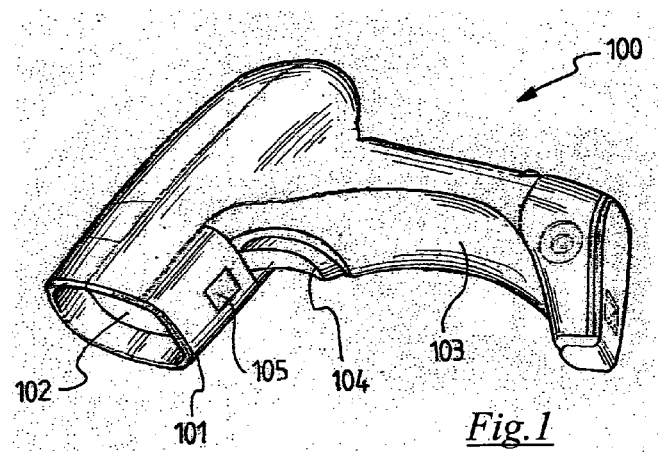
Fig.1
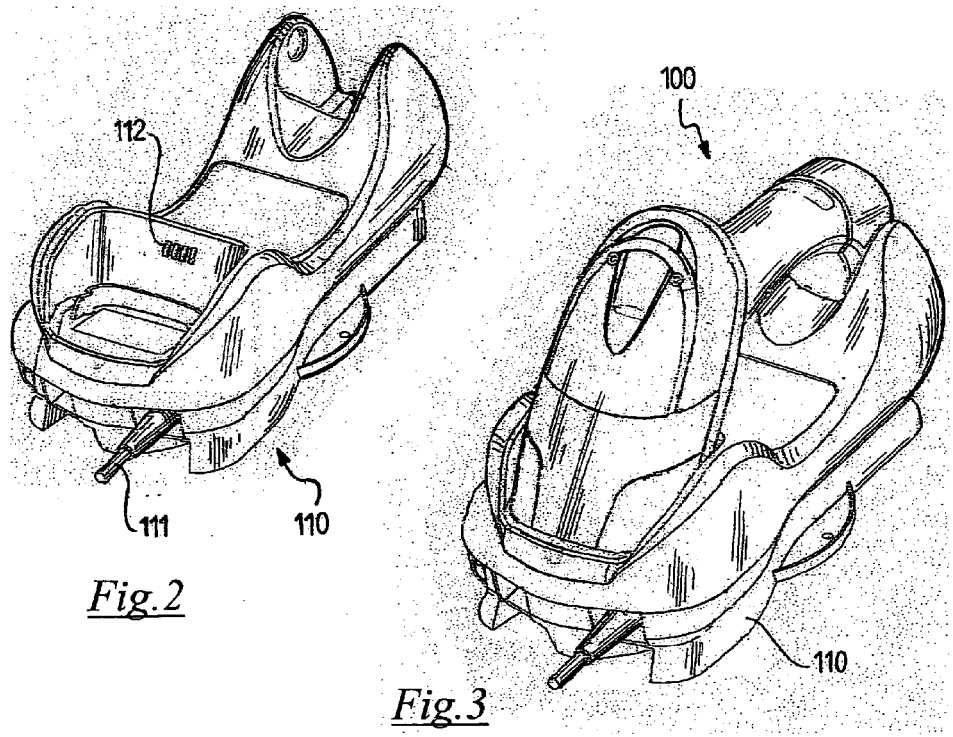
Fig.2
Fig.3

RECHARGE CRADLE FOR A CODED INFORMATION READER AND READING SYSTEM COMPRISING IT

The present invention relates to a recharge cradle for a coded information reader, as well as a reading system comprising it.

Hereinafter in the present description and in the subsequent claims, the expression "coded information" is used for indicating both an "optical code" as better specified below, and coded information stored in an RFID transponder or tag.

An RFID transponder or tag is an electronic component composed of a chip and an antenna. The chip comprises a non-volatile memory containing a unique code. An RFID reader generates an electromagnetic/electric field at an excitation frequency for the RFID transponder which, once entered into such field, transmits a signal containing the unique code towards the RFID reader. An analogous method is used for writing information in the RFID transponder. In the case of a passive RFID tag, the power supply is obtained via induction by the electromagnetic/electric field; the active RFID tags are instead fed by a small internal battery. An RFID tag can have even very small size, such as to permit insertion thereof in labels for commercial products or in credit cards and tickets, so-called "contactless smart cards"

The expression "optical code" is used for indicating any graphical representation having the function of storing information coded by means of suitable combinations of elements of pre-established shape, for example square, rectangular or hexagonal elements, dark coloured (normally black) separated by light coloured elements (spaces, normally white), such as barcodes, stacked codes, i.e. with stacked bar sequences, and two-dimensional codes in general, colour codes, etc., as well as alphanumeric characters and particular shapes or patterns such as stamps, logos, signatures etc. The expression "optical code" also comprises graphical representations detectable not only in the field of visible light, but also in the wavelength range comprised between infrared and ultraviolet.

In the optical readers of the scanning type, a light beam, in particular a laser beam, suitably focused by appropriate optics, is made to hit a deflection system, generally consisting of a rotating or oscillating mirror, in order to generate one or more scanning lines through the optical code. In the optical code readers of the imager type, the entire optical code is simultaneously illuminated. The light diffused by the code is collected by suitable optics and conveyed onto a photodetector element, which converts its intensity into an electrical signal. The distribution of the electrical signal over time during the illumination of the optical code by means of the scanning line, or the distribution of the electrical signal in space in case of illuminating the entire optical code, is indicative of the presence or absence, as well as relative size and possibly colour, of the elements composing the optical code. By means of such electrical signal, appropriately processed, it is therefore possible to acquire the optical code and decode the information coded therein.

With reference to FIGS. 1-3, a hand held optical code reader 100 of the prior art is generally has gun shaped and comprises a reading head 101 provided with a light input and output window 102 and a holdable handle 103, possibly provided with a trigger-type activation push-button 104 and possible other control push-buttons.

The reader 100 houses, suitably arranged between the head 101 and the handle 103, the light source, the emitting and receiving optics, the possible deflection and/or scanning mirrors and the photodetector, as well as one or more rechargeable batteries intended for supplying power to the same.

The reader 100 can moreover house electronics for pre-processing the photodetector output signal, electronics for code acquisition and possibly for decoding the optical code, recharging circuits of the batteries, one or more memories, as well as a communication interface for transferring the electric signal output by the photodetector or the acquired optical code or also the decoded optical code, as well as for receiving setting commands and possibly remote-activation commands.

The reader 100 is associated with a so-called cradle 110, which in addition to acting as a support base for placing the reader 100 when not in use, can also be used for the collection of raw or already processed data from the reader 100 and for transferring such data to a remote processor, and for transmitting configuration parameters to the reader 100.

The cradle 110, power supplied by the electrical mains through a cable 111, also acts as a recharging base of the reader 100. In order to supply current to the batteries of the reader 100, the cradle 100 is provided with electrical contacts 112 that are coupled with electrical contacts 105 of the reader 100 when this is placed on the cradle 110. Of course, when the reader 100 is hand held for use, the recharging of the batteries is interrupted.

U.S. Pat. No. 7,040,540 discloses a portable reader of the type described above, which is set in a non-operative condition when it is discharged and therefore must be placed back on the cradle.

Hand held readers and associated cradles are also known which permit use also while the reader is placed on the cradle, in a so-called "presentation scanner" mode. Such a mode is advantageous when the reading operations are very repetitive and the objects bearing the optical codes can be easily brought always in the same reading position, such as for example in a point of sale. The reader assumes an upright position in the cradle. The cradle or the reader can be provided with an object presence detection system and consequent automatic activation of the reader.

In presentation scanners, the battery recharge electrical contacts are typically arranged on the lower part of the handle of the reader, and, respectively, in a recessed seat of the cradle which houses the reader handle or a lower portion thereof. When the reader is placed in the cradle, it is recharged and therefore the probability of work interruption is reduced, even if the reader is sometimes removed from the cradle in order to be aimed directly at the object bearing the optical code. A presentation scanner of this type, wherein the orientation of the reader is not adjustable, is described in one of the embodiments of U.S. Pat. No. 7,051,940 B2. In addition to not having an adjustable orientation, the system is not very stable and bulky when the reader is not in use.

Also the reader of the abovementioned U.S. Pat. No. 7,040,540 can be used in presentation scanner mode with a single reader orientation.

Presentation scanners are also known wherein the orientation of the reader is adjustable with respect to the cradle, so that it can be optimised for the geometry of the point of use, for the operator position, in order to present the optical code to the reader in the most comfortable position for the operator.

U.S. Pat. No. 7,222,794 B2, U.S. Pat. No. 7,048,188 B2 and U.S. Pat. No. 5,661,292 disclose presentation scanners wherein the reader is however supplied via cable and not battery operated, which involves constraints in portable configuration use.

The abovementioned U.S. Pat. No. 7,051,940 B2 also discloses, in another embodiment, a reader of the presentation scanner type with adjustable position in which the reader is battery supplied. However, it is silent on how the battery recharging occurs, in particular on how it can occur irrespectively of the reader position adjustment.

Lastly, U.S. Pat. No. 5,796,091 discloses a presentation scanner having a battery-type reader and an orientable recharge cradle. The recharge cradle comprises a base part and a reader support part, pivoted to the base part and fixable therein in a plurality of angular positions. The base part contains a PCB which i.a. acts as a recharge circuit of the batteries of the reader. It follows that the coupling between the electrical contacts on the reader and the electrical contacts on the cradle, not shown, can only occur in one of the plurality of angular positions. The Applicant observes that also the induction recharge system described in such document permits recharging only when the two induction coils are magnetically coupled, and therefore not irrespectively of the angular position of the reader, besides having poor efficiency.

The technical problem at the basis of the present invention is to provide a recharge cradle for a coded information reader that permits recharging irrespectively of the reader orientation.

The invention thus regards, in a first aspect thereof, a cradle for a hand held, battery-supplied code information reader, comprising a base part and a reader support part which can be oriented with respect to the base part in at least two positions, said cradle comprising a power supply input and a supply/recharge electrical interface for coupling with an electrical interface of the reader when supported in the cradle, characterised in that said power supply input and said electrical interface of the cradle are housed in said support part.

By arranging the electrical interface of the cradle in the support part, the electrical coupling with the electrical interface of the reader when supported in the cradle is ensured, irrespectively of the mutual position between the support part and the base part of the cradle, and thus irrespectively of the orientation of the coded information reader.

Preferably, said support part comprises a housing seat for the reader and said electrical interface comprises a plurality of electrical contacts facing in said housing seat.

In order to increase safety against the accidental falling of the reader from the cradle, said housing seat preferably further comprises means for retaining said reader.

Preferably, the base part comprises two opposite and spaced walls, the support part being oblong, the support part being insertable between said two walls in the proximity of a first end thereof and having a second end, said housing seat comprising a first recess in the proximity of said first end, suitable to receive a lower part of a handle of the reader and second recess in the proximity of said second end, suitable to receive in abutment a part of a head of the reader and provided with said retaining means, one of said first and said second recesses being provided with said electrical contacts.

In such a manner, the support part supports the reader in two points, increasing its stability.

Preferably, said base part is suitable to being supported on or fixed to a surface and said at least two positions of the support part comprise a first position parallel to said surface and at least one second position not parallel to the surface.

In the present description and in the enclosed claims, the term "parallel" is to be construed as comprising positions at small angles with respect to the support or fixing surface of the base.

The first position advantageously has particularly reduced dimensions and can be used for the reading of coded information on substantially flat media or for placing the reader in the cradle in recharge-only mode. The second position(s) permits the use of the reader in "presentation scanner mode". Here and hereinafter in following description and in the attached claims, the term scanner should be broadly understood as also encompassing readers of coded information different from optical codes.

In one embodiment, the coupling between the base part and the support part comprises at least one projection and an associated plurality of seats, in each of said at least two positions said at least one projection being received in one of said seats.

In such a manner, only a discrete number of orientations are made possible. For example, the base part can comprise two opposite and spaced walls, the support part engaging therebetween. By making the projection on the support part and a series of seats or grooves on one wall of the base part, which can be elastically spaced or removed from the other wall of the base part, it is possible to insert the support part between the walls, changing its orientation. At the other wall, the coupling can be analogous or comprised of a pin projecting from the support part and a receiving hole in the base part, or vice versa.

In particular, the base part preferably comprises two opposite and spaced walls, the support part being insertable between said two walls, said at least one of said walls being able to be elastically spaced or removable from the other wall of the base part.

More preferably, at least one of said walls or the facing region of the support part, respectively, has a plurality of seats and said region or said at least one of said walls, respectively, has a projection matching each of said seats.

The choice of the seat coupling to the projection, and consequently the choice of the reader orientation, can be made only in the cradle assembly step, in order to provide, for example, a recharge and rest cradle or a recharge and support cradle for presentation scanner, without having to manufacture and store two separate cradles.

Such choice can also be left to the user, thus providing a cradle capable of carrying out both functions and possibly modifying the orientation of the reader in presentation scanner mode.

Advantageously, said projection is elastically forced each time into one of said plurality of seats, means for moving the projection away from said one of said plurality of seats being provided.

More preferably, said means for moving away are accessible from outside said cradle.

In another embodiment, the support part is pivotally associated with the base part and said at least two positions comprise a continuum of angular positions.

In such a manner, it is possible to increase the use flexibility of the reader in presentation scanner mode, optimising its orientation with respect to the presentation position of the objects bearing the coded information.

In order to increase safety, the cradle can comprise locking means of the support part with respect to the base part in each of said continuum of angular positions.

For example, the support part can be pivoted to the base part, and be provided with a friction system or a setscrew for fixing the support part at a desired mutual angle.

More preferably, the cradle comprises adjusting means of the orientation of the support part with respect to the base part, accessible from outside said cradle.

Preferably, the cradle and in particular said support part further comprises at least one communication interface with the reader.

The data communications can occur via cable, via infrared, via radio or in other modes.

Preferably, the cradle and in particular said support part further comprises at least one communication interface with a remote processor.

Also in this case, the data communications can occur via cable, via infrared, via radio or in other modes.

Preferably, the cradle and in particular the support part further comprises a user interface.

Said user interface can comprise at least one activation push-button of a function selected from the group consisting of data communications, reader configuration, enabling and exclusion of an acoustical or luminous signalling, activation of an accessory functionality of the base.

Said user interface can further comprise at least one acoustic and/or luminous device, such as an LED signalling that charging is underway, acquisition is underway or data transmission is underway.

Advantageously, the base part of the cradle comprises at least one internal cavity suitable to receive ballast material.

With such provision, which is an inventive aspect of the cradle independent of what outlined above, it can be avoided to provide for a metal plate weighing down the base, which prevents the overturning of the same and of the reader; sand, metal beads or other heavy material can be used which is cheaper than manufacturing a specific metal plate for each cradle. If the cradle is only used as recharge base and therefore not in presentation scanner mode, the cavity can be left empty, with further economic savings.

Alternatively, the base part of the cradle or some portions thereof can be made of a heavy material, for example in die-cast metal.

The cradle and in particular the support part can contain an additional space for a backup battery back.

In a second aspect thereof, the invention relates to a coded information reading system comprising a cradle according to any of the preceding claims and a hand held, battery-powered optical code reader having a power supply/recharge electrical interface for coupling with said electrical interface of the cradle.

Characteristics and advantages of the invention will now be better illustrated with reference to embodiments thereof represented as non-limiting examples in the attached drawings, wherein:

FIGS. 1-3, already described, show a hand held optical code reader, a recharge cradle thereof and the two devices coupled to each other, respectively, according to the prior art;

Figure 4:
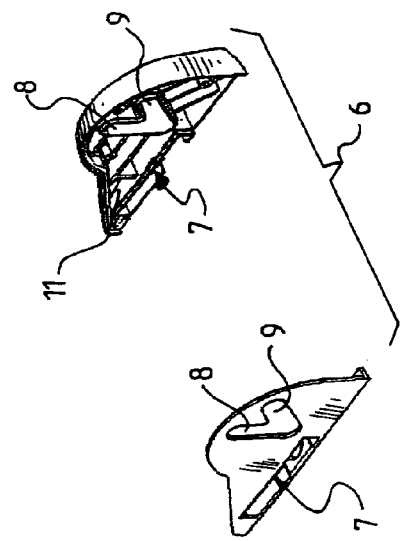
FIG. 4 is a partially exploded view of a cradle according to the invention.
Figure 4:
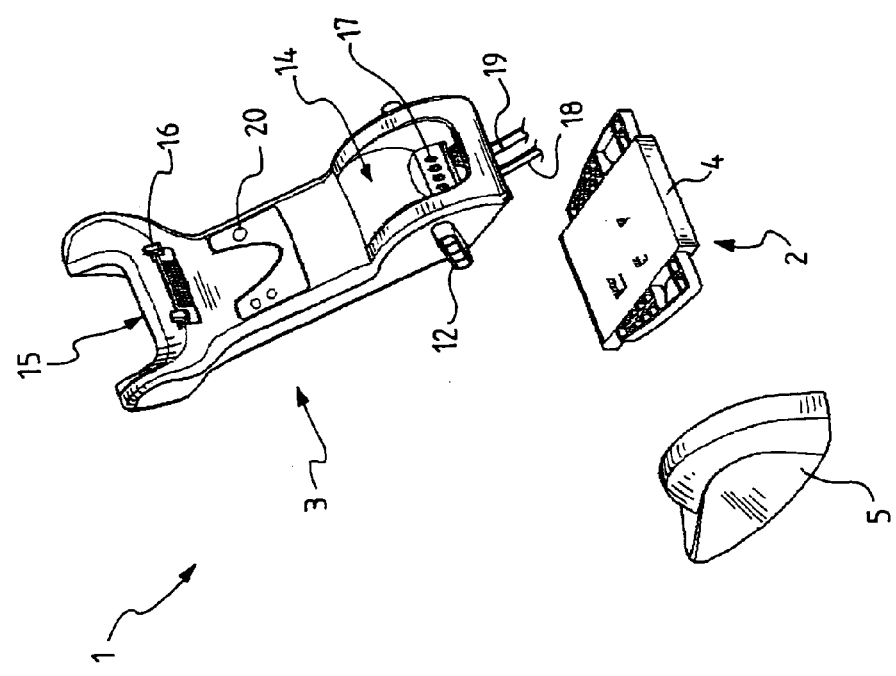

With reference to FIG. 4, a cradle 1 for a hand held coded information reader comprises a base part 2 and a support part 3.

The base part 2 has a bottom 4 and two opposite and spaced walls 5, 6, upright and substantially perpendicular to the bottom 4.

Each wall 5,6 can be fixed to the bottom 4 when this is engaged in a groove 7 of the wall 5, 6. Alternatively, the wall 5 can be elastically spaced from the bottom and/or with respect to the wall 6. Still alternatively, one of the walls 5, 6 can be made integrally with or in any case removably fixed to the bottom 4.

Figure 5:
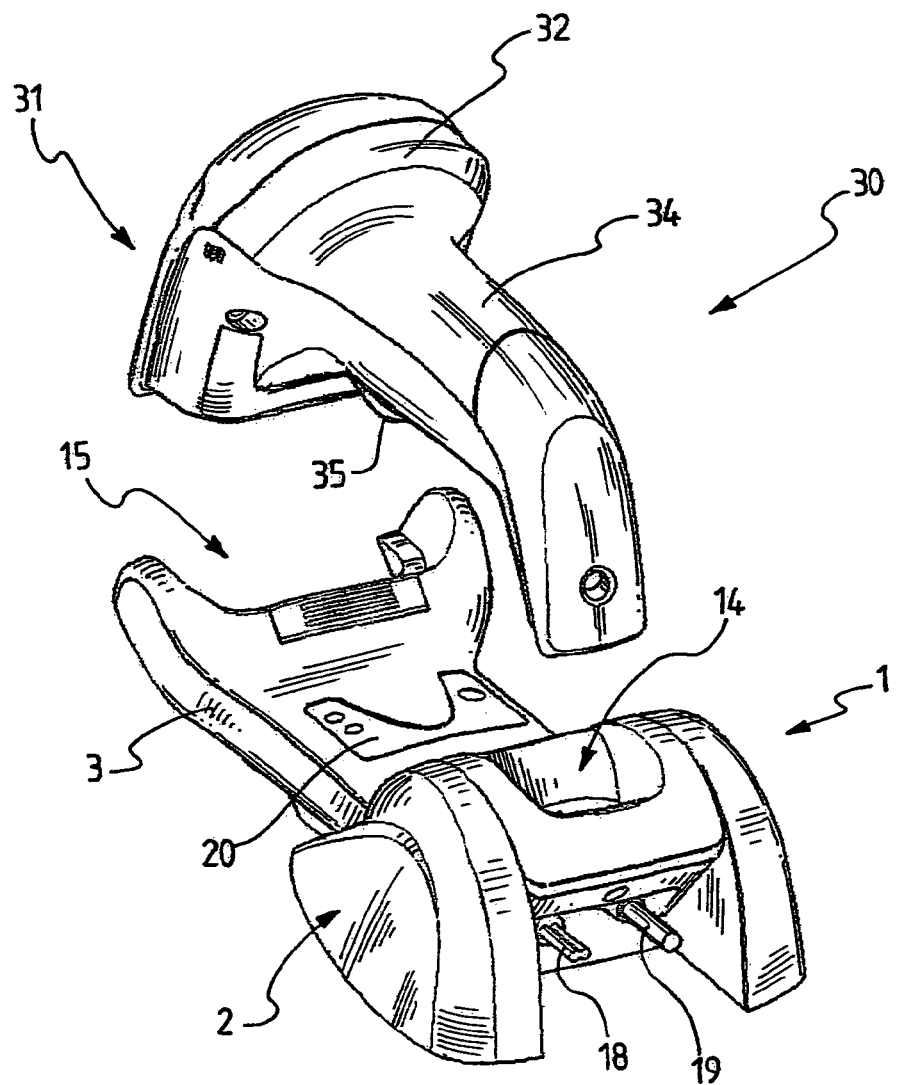
FIG. 5 illustrates a reading system comprising the cradle of FIG. 4 and a coded information reader, in a first operative configuration.

Each wall 5, 6 also has, on its face facing the other wall 6, 5, a plurality of seats 8, 9 having different orientation with respect to the bottom 4. In FIG. 5, only the seats of wall 6 are visible, shown as two substantially rectangular seats 8, 9 having two different slopes and merging so to form a V notch, but the seats can also not intersect each other, and can be provided in a number greater than two.

The base part 2 of the cradle 1 also has cavities 11, shown in the wall 6 to exemplify their presence also in the wall 5, but alternatively or additionally they can also be made in bottom 4.

A heavy, loose material, for example sand or metal beads, can be arranged in the cavities 11 for weighing down the base 2 of the cradle 1 when this is supported on a support surface.

Alternatively, or additionally, the walls 5, 6 or the bottom 4 of the base part 2 can be made of heavy material, for example die-cast metal.

The base part 2 can also be fixed to a horizontal or non-horizontal fixing surface, for example by means of screws passing through holes (not shown) of its bottom 4 or of one of the walls 5, 6.

The support part 3 has an oblong form. At a first end thereof, the support part 3 is insertable between the walls 5, 6 of the base part 2. More in particular, on the side of each of the walls 5, 6, the support part 3 has a projection 12 of a shape matching each of the seats 8, 9.

At the first end, the support part 3 also comprises a first recess 14 suitable to receive a first part of a hand held coded information reader, for example a lower part of a handle of a gun shaped reader, such as for example the reader 31 subsequently described with reference to FIG. 5.

At the second end opposite the first end, the support part 3 comprises a second recess 15, suitable to receive a second part of the reader, for example to receive in abutment the head of a gun shaped reader.

The second recess 15 can also be provided with retaining means of the reader, for example one or more lugs 16 suitable to engage in grooves of the reader, or a magnet suitable to attract a ferromagnetic element of the reader, or vice versa.

The first recess 14 and the second recess 15 form a seat for housing the reader.

The support part 3 can therefore be coupled with the base part 2 in an orientable manner, in a number of positions corresponding to the number of seats 8, 9. More in particular, with the wall 5 detached or spaced away from the wall 6, for example after having engaged only the wall 6 on the bottom 4, the support part 3 is oriented such that its projections 12 are oriented along the direction of the seat 8 or seat 9, respectively, in each of the walls 5, 6; then, also the wall 5 is engaged on the bottom 4, or allowed to elastically approach the wall 6.

Preferably, the orientation of the projection 12 and of one of the seats—seat 8 in FIG. 4—is such that the support part 3—and the coded information reader arranged therein—is substantially parallel to the support or fixing surface of the bottom 4 of the base part 2 (see FIG. 5). In such a configuration, the cradle is particularly compact, but, if the coded information are optical codes, the light input/output window of the reader is facing the surface itself, so that the reader is only usable for reading optical codes provided on substantially flat objects.

Figure 6:
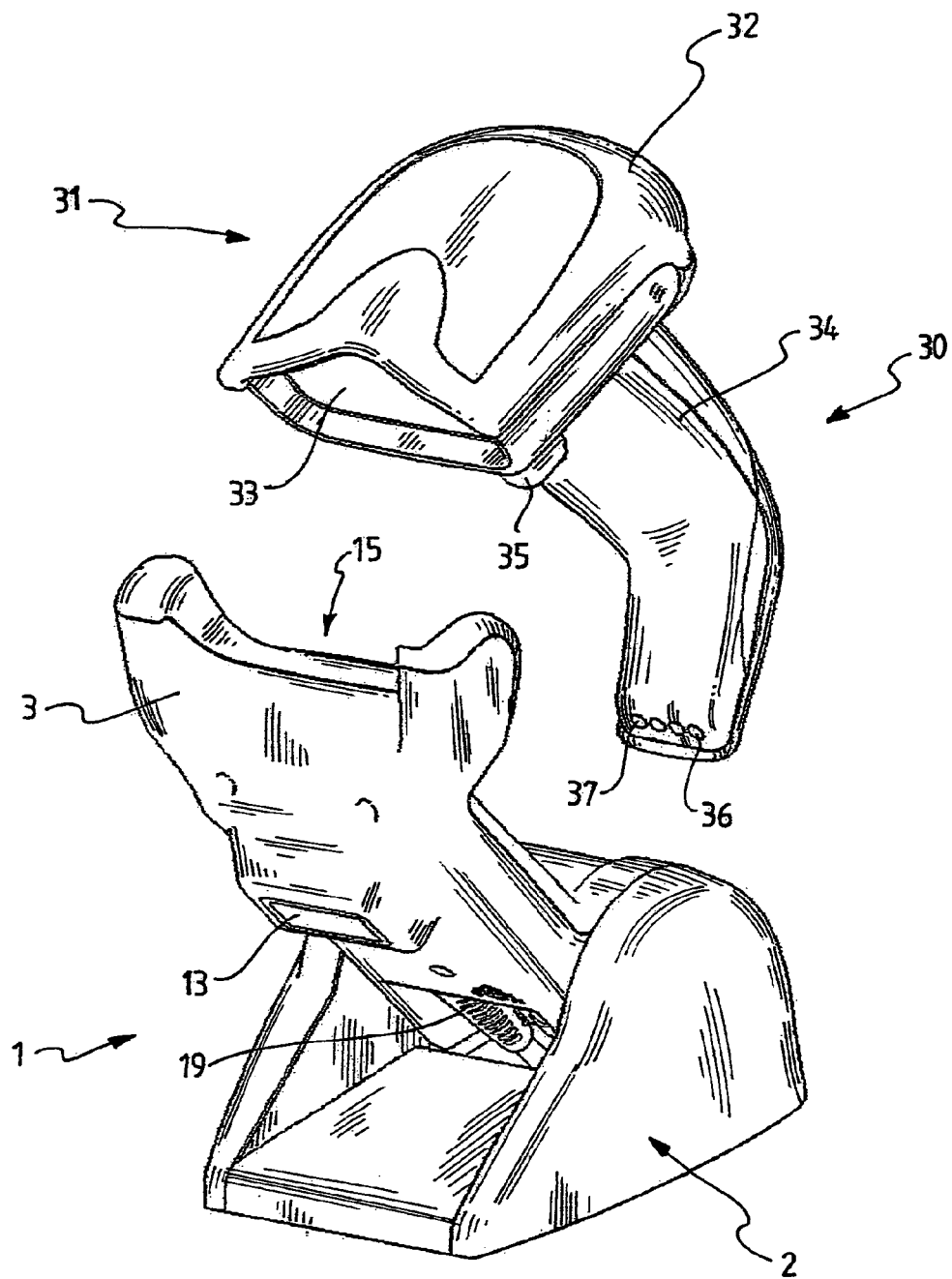
FIG. 6 illustrates the reading system of FIGS. 4 and 6, in a second operative configuration.

On the other hand, the orientation of the other seat 9—or of the further seats—is preferably such that the support part 3—and the coded information reader arranged therein—is tilted or orthogonal with respect to the support or fixing surface of the bottom 4 of the base part 2, in order to face, in the case of an optical code reader, the light input/output window of the reader towards a reading position, in presentation scanner mode, not necessarily on the surface itself (see FIG. 6).

It should be noted that the orientation according to either seat 8 or 9 can be chosen in the factory, for example by subsequently irremovably binding the wall 5 by means of gluing, welding, ultrasound recasting and the like, or by providing an irremovable keying of the bottom 4 in the groove 7, or the choice can be left to the customer. In the first case, a single cradle type can be provided in two alternative configurations, one suitable to act only as a recharge cradle and the other suitable to act as, besides as a recharge cradle, also as a support of the reader in presentation scanner mode, with manufacturing and storage cost savings.

The recharge function of a battery-type hand held reader placed in the cradle 1 is ensured, in any orientation of the support part 3 with respect to the base part 2, in that the support part 3 has a power supply/recharge interface, in the form of electrical contacts 17 facing from the seat for housing the reader. The electrical contacts 17 can be facing in the first recess 14 of the housing seat as shown, but they can alternatively be facing in the second recess 15. The arrangement in the second recess 15 can also contribute to maintaining the electrical contact in case of reader oscillations.

The support part 3 of the cradle 1 also has a power supply input from an external source, such as a cable 18 connectable to the electrical mains or to a remote device, for example a processor. In such a manner, no electrical coupling is necessary between the base part 2 and the support part 3 of the cradle 1.

The support part 3 can also comprise transformers and/or recharge circuits to adapt the power supply/recharge current or voltage to the batteries of the hand held reader. Alternatively, such recharge circuits could be housed in the reader. In the latter case, the support part 3 can contain the necessary control electronics for diverting the voltage to the recharge circuit of the reader.

The support part 3 can also advantageously contain a backup battery pack, housed in a suitable space and preferably constantly kept under charge.

If the base part 2 is also power supplied, the backup battery pack can alternatively or additionally be housed in the base part 2, also contributing to weighing down the same.

The cradle 1, in particular its support part 3, can also comprise at least one communication interface with the reader.

Communication can occur by means of contacts that are additional to the power supply/recharge contacts 17, but can also occur via infrared, via radio and in other modes, in which case the cradle 1, in particular its support part 3, houses a receiving, transmitting or transceiving antenna, or receiving, transmitting or transceiver device, corresponding devices being provided in the reader.

Cradle 1, and in particular its support part 3, can in such a case act as a raw or processed data collector, such data being related to the coded information detected by the reader. The cradle 1 can in such a case provide for a memory for such information, processing and/or decoding electronics of the same and/or a communication interface with a remote processor. Also the communication with the remote processor can occur via cable, for example via cable 19, or via infrared, via radio or in other modes, corresponding devices being provided for in the cradle 1 and in particular in its support part 3.

By means of the communication interface(s), the cradle 1 can also provide for sending configuration parameters to the reader, set by means of a user interface (schematically indicated as a plurality of push-buttons and/or LEDs 20) of the cradle 1 itself, or for forwarding configuration parameters of the reader set in the remote processor.

The cradle 1, and in particular its support part 3, can also comprise auxiliary devices having different functions useful in the fields where coded information readers find application, said devices being controlled by means of the user interface 20.

The user interface 20 can also comprise one or more acoustic and/or luminous indicator devices, such as a buzzer and/or a LED signalling that charging is underway, that acquisition is underway, that data transmission is underway, diagnostics and the like. The buzzer can be made with an eccentric micromotor, for example one of the type employed in mobile phones.

The user interface can also comprise one or more push-buttons for enabling or disabling such acoustic and/or luminous indicator devices.

It will be understood that in the described embodiment, at one of the two walls 5, 6, the seats 8, 9 and the associated projection 12 of the support part 3 can be replaced by a hole on the wall of the base part 2 and a pin on the support part 3, or vice versa, or by other coupling means suitable to allow the orientations of the support part 3 permitted by the coupling, at the other of the two walls 5, 6, of the projection 12 in one of the seats 8, 9 of the base part 2.

Still alternatively, at either or both of the walls 5, 6, the projection 12 of the support part 3 could be made on the wall of the base part 2, making the seats 8, 9 on the support part 3.

FIGS. 5 and 6 illustrate a coded information reading system 30 comprising the cradle 1 and a hand held optical code reader 31.

In FIG. 5, the support part 3 is oriented substantially parallel to the support or fixing surface of the bottom 4 of the base part 2, in that the projections 12 of the support part 3 are inserted in the seat 8 of each wall 5, 6.

In FIG. 6, the support part 3 is tilted with respect to the support or fixing surface of the bottom 4 of the base part 2, in that the projections 12 of the support part 3 are inserted in the seat 9 of each wall 5, 6.

The reader 31 is generally gun shaped and comprises a reading head 32 and a holdable handle 34, which can be provided with a trigger-type activation push-button and possible other control push-buttons (not shown).

The lower end of the handle 34 is so shaped to be inserted in the first recess 14 of the support part 3 of the cradle 1, and the head 32 is so shaped to rest in the second recess 15 of the support part 3 of the cradle 1.

Thanks to the curved shape of the support part 3 of the cradle 1 and/or to the gun shape of the reader 31, when the reader 31 is inserted in the housing seat of the cradle, its handle 34 is spaced from the support part 3 of the cradle and is therefore easy to grip.

The reader 31 also houses one or more rechargeable batteries, intended for supplying power to its components, and possibly recharging circuits therefor.

The reader 31 has electrical contacts 36 in the proximity of its lower end, in such a position as to come into contact with the electrical contacts 17 of the cradle 1 when it is placed therein.

In the case of an optical code reader, the reading head 32 is provided with a light input and output window 33 and the reader 31 houses, appropriately arranged between the head 32 and the handle 34, a light beam emitting source, emitting and receiving optics, and a photodetector, as well as possible scanning mirrors of the light beam emitted by the light source and/or mirrors for deflecting such light beam towards the window 33 and/or for deflecting the light diffused by the optical code entering from the window 33 onto the photodetector, according to any configuration known in the art.

The reader 31 can also house pre-processing electronics of the photodetector output signal, electronics for code acquisition and possibly for decoding the optical code, one or more memories, as well as a communication interface for transferring the electrical signal output by the photodetector or the acquired optical code or also the decoded optical code, as well as for receiving setting commands and possibly remote-activation commands. The communication can occur by means of an electrical interface, preferably comprising contacts 37 in the proximity of the power supply/recharge contacts, or via radio, via infrared or other cordless type.

The communication interface 37 of the reader 31 can be coupled with the suitable communication interface of the cradle 1 as shown, or it can be directly coupled, preferably in cordless mode, with an interface of a remote processor.

The reader 31 can, alternatively or additionally, read and/or write RFID tags via radiofrequency. In such a case, the reader 31 comprises means for generating an electromagnetic/electric field at an excitation frequency for the RFID transponder and a receiving, transmitting or transceiving antenna for receiving and/or transmitting a signal containing a code stored in an RFID tag. The RFID reader can also comprise processing and/or decoding electronics of such signal and possibly one or more memories, as well as a communication interface, analogously to the optical code reader.

Also shown in FIG. 6, on the side of the support part 3 opposite the seats 14, 15, is an emitter 13 of UV, IR, laser or white light radiation which projects a radiation beam towards the support surface of the cradle 1. When an operator of the reading system 31 arranges, for example, a banknote or other object within the radiation beam, the fluorescent ink or fluorescent fibres provided in the banknote itself, excited by the UV or IR radiation, emit visible light that the operator is capable of interpreting as proof of the banknote's authenticity. In the absence of such visible emission, the operator recognises that the banknote is false.

Similarly, laser light or white light permits highlighting a hologram provided on the banknote.

Figure 7:
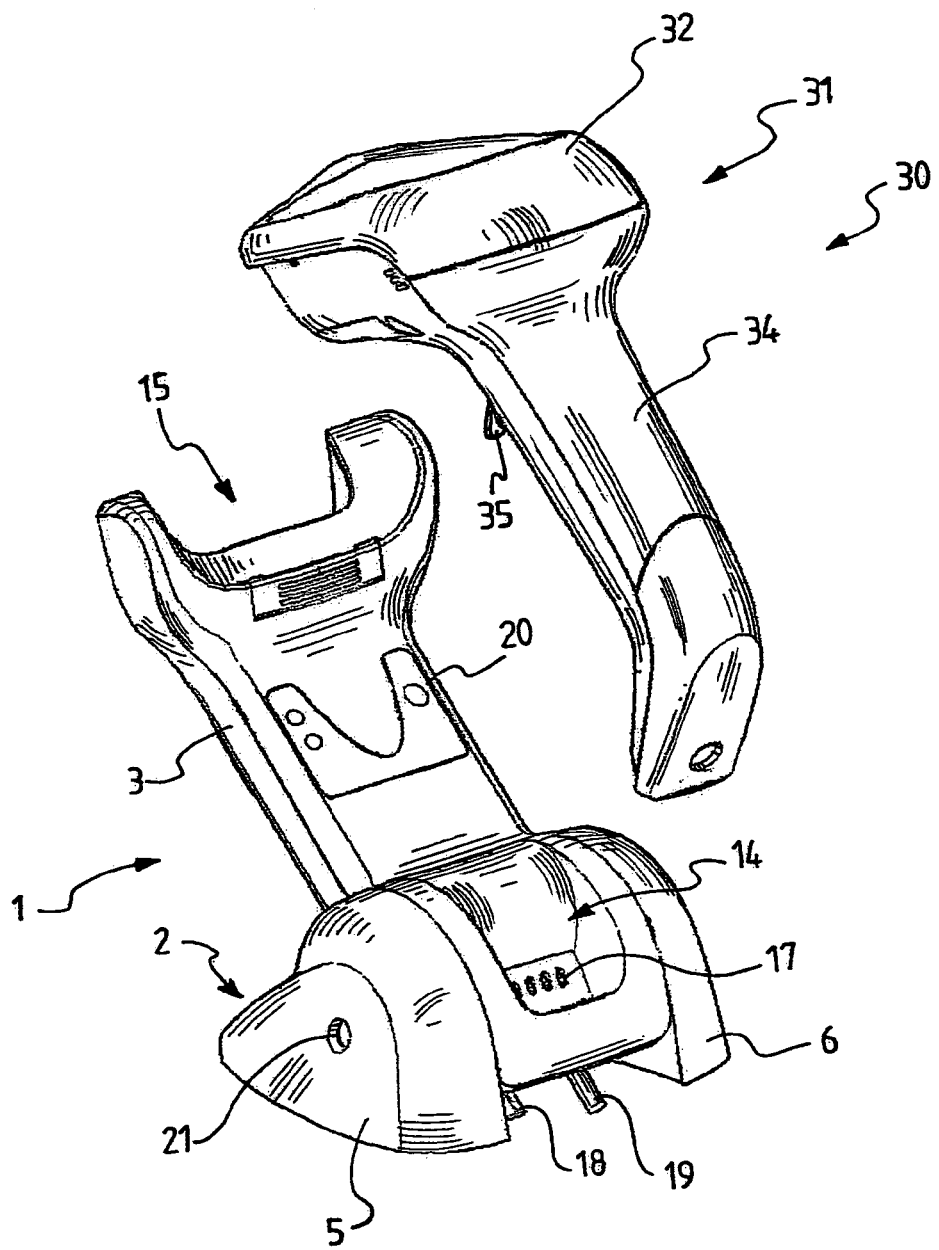
FIG. 7 shows a reading system according to the invention having modified coupling means between a base part and a support part of the cradle.

In another embodiment, illustrated in FIG. 7, the coupling means between the base part 2 and the support part 3 of the cradle 1 are accessible from outside the cradle 1 in order to adjust its coupling.

For example, it can be provided that the projection 12 can recede in a suitable seat of the support part 3, inside of which a return spring is housed. A release push-button 21, when held pressed, pushes the projection 12 into the seat, compressing the spring and freeing the projection 12 from the coupling with the seat 8 or 9, respectively, thus permitting the rotation of the support part 3 with respect to the base part 2; once the support part 3 is rotated with respect to the base part 2 until the projection 12 is brought to face the other seat 9 or 8, respectively, the push-button 21 is released and the spring pushes the projection 12 outwardly, causing its locking within the new seat 9 or 8, respectively.

Also in this case, at either of the walls 5, 6, the coupling between the support part 3 and the base part 2 can be of pin type.

Alternatively, the coupling could comprise, in place of the plurality of seats 8, 9 in the wall 5, a single seat that can be oriented by means of an adjustment pin 21.

The support part 3 can also be pivotally associated with the base part 2 so as to take up, with respect thereto, a continuum of angular positions, thus increasing the use flexibility of the reader in presentation scanner mode, since the orientation of the support part 3 and thus of the reader can be optimised with respect to the presentation position of the objects bearing the coded information.

For example, the support part 3 can be pivoted on the base part 2 and a friction system or a setscrew for fixing the support part at a desired mutual angle can be provided.

It is understood that the only essential function of the bottom 4 of the base part 2 is that of mutually binding the walls 5 and 6 and that it can therefore be replaced by one or more pins or strips.

The invention claimed is:

1. A cradle for a hand held, battery-supplied coded information reader, comprising a base part and a support part of the reader which can be oriented with respect to the base part in at least two fixed positions, said cradle comprising a power supply input and a power supply/recharge electrical interface for coupling with an electrical interface of the reader when supported in the cradle, wherein said power supply input and said electrical interface of the cradle are housed in said support part such that said power supply input and said electrical interface of the cradle permit recharging through said electrical interface of the reader when said support part is oriented in said at least two fixed positions.

2. The cradle according to claim 1, wherein said support part comprises a housing seat for the reader and said electrical interface comprises a plurality of electrical contacts in said housing seat.

3. The cradle according to claim 2, wherein said housing seat further comprises means for retaining said reader.

4. A cradle for a hand held, battery supplied coded information reader, comprising a base part and a support part of the reader which can be oriented with respect to the base part in at least two positions, said cradle comprising a power supply input and a power supply/recharge electrical interface for coupling with an electrical interface of the reader when supported in the cradle, wherein said power supply input and said electrical interface of the cradle are housed in said support part, wherein said support part comprises a housing seat for the reader and said electrical interface comprises a plurality of electrical contacts in said housing seat, wherein said housing seat further comprises means for retaining said reader, and wherein the base part comprises two opposite and spaced walls, the support part being oblong, the support part being insertable between said at least two walls in the proximity of a first end thereof and having a second end, said housing seat comprising a first recess in the proximity of said first end, suitable to receive a lower part of a handle of the reader and a second recess in the proximity of said second end, suitable to receive in abutment a part of a head of the reader and provided with said retaining means, one of said first and said second recesses being provided with said electrical contacts.

5. The cradle according to claim 1, wherein said base part is suitable to be supported on or fixed to a surface and said at least two positions of the support part comprise a first position parallel to said surface and at least one second position not parallel to the surface.

6. The cradle according to claim 1, wherein a coupling between the base part and the support part comprises at least one projection and an associated plurality of seats, in each of said at least two positions said at least one projection being received in one of said seats.

7. A cradle for a hand held, battery-supplied coded information reader, comprising a base part and a support part of the reader which can be oriented with respect to the base part in at least two positions, said cradle comprising a power supply input and a power supply/recharge electrical interface for coupling with an electrical interface of the reader when supported in the cradle, wherein said power supply input and said electrical interface of the cradle are housed in said support part, wherein a coupling between the base part and the support part comprises at least one projection and an associated plurality of seats, in each of said at least two positions said at least one projection being received in one of said seats, and wherein the base part comprises two opposite and spaced walls, the support part being insertable between said two walls, said at least one of said walls being able to be elastically spaced away or detachable from the other wall of the base part.

8. The cradle according to claim 7, wherein at least one of said walls or the facing region of the support part, respectively, has a plurality of seats and said region or said at least one of said walls, respectively, has a projection matching each of said seats.

9. The cradle according to claim 8, wherein said projection is elastically forced each time into one of said plurality of seats, the cradle further comprising means for moving the projection away from said one of said plurality of seats.

10. The cradle according to claim 9, wherein said means for moving the projection away are accessible from outside the cradle.

11. The cradle according to claim 1, wherein the support part is pivotally associated with the base part and said at least two positions comprise a continuum of angular positions.

12. The cradle according to claim 11, comprising locking means for locking the support part with respect to the base part in each of said continuum of angular positions.

13. The cradle according to claim 11, further comprising adjusting means for adjusting the orientation of the support part with respect to the base part accessible from outside said cradle.

14. The cradle according to claim 1, wherein said support part further comprises at least one communication interface for communicating with the reader.

15. The cradle according to claim 1, wherein said support part further comprises at least one communication interface for communicating with a remote processor.

16. The cradle according to claim 1, wherein the support part further comprises a user interface.

17. The cradle according to claim 16, wherein said user interface comprises at least one activation push-button for activating a function selected from the group consisting of data communications, reader configuration, enabling and exclusion of an acoustic or luminous indicator, and activation of an accessory functionality of the base.

18. The cradle according to claim 16, wherein said user interface further comprises at least one acoustic and/or luminous device.

19. The cradle according to claim 1, wherein the base part of the cradle comprises at least one inner cavity suitable to receive ballast material.

20. The cradle according to claim 1, comprising an additional space for a back up battery pack.

21. A coded information reading system comprising a cradle according to claim 1 and a hand held, battery-powered optical code reader having a power supply/recharge electrical interface for coupling with said electrical interface of the cradle.

* * * * *